US012611687B1

(12) United States Patent
Li

(10) Patent No.: US 12,611,687 B1
(45) Date of Patent: Apr. 28, 2026

(54) ELECTRIC SPRAY GUN

(71) Applicant: Suqin Li, Taizhou City (CN)

(72) Inventor: Suqin Li, Taizhou City (CN)

( * ) Notice: Subject to any disclaimer, the term of this patent is extended or adjusted under 35 U.S.C. 154(b) by 0 days.

(21) Appl. No.: 19/081,115

(22) Filed: Mar. 17, 2025

(30) Foreign Application Priority Data

Oct. 31, 2024 (CN) ......................... 202422642071.3

(51) Int. Cl.
*B05B 9/08* (2006.01)

(52) U.S. Cl.
CPC .................................. *B05B 9/0861* (2013.01)

(58) Field of Classification Search
CPC ........... B05B 9/01; B05B 9/04; B05B 9/0403; B05B 9/0413; B05B 9/0416; B05B 9/0426; B05B 9/08; B05B 9/085; B05B 9/0855; B05B 9/0861; B05B 9/0866; B05B 12/002
See application file for complete search history.

(56) References Cited

U.S. PATENT DOCUMENTS

| | | | | | |
|---|---|---|---|---|---|
| 5,071,069 | A | * | 12/1991 | Stirm | B08B 3/028 239/128 |
| 2020/0238316 | A1 | * | 7/2020 | Zhang | B05B 9/0426 |
| 2021/0129190 | A1 | * | 5/2021 | Qiao | F04B 53/16 |
| 2021/0138499 | A1 | * | 5/2021 | Hazel | B08B 3/026 |
| 2023/0381830 | A1 | * | 11/2023 | Petric | F04B 17/03 |
| 2025/0108396 | A1 | * | 4/2025 | Wu | H05K 5/02 |

FOREIGN PATENT DOCUMENTS

| | | | | | |
|---|---|---|---|---|---|
| CN | 108317273 | A | * | 7/2018 | B05B 9/01 |

* cited by examiner

*Primary Examiner* — Darren W Gorman

(57) ABSTRACT

An electric spray gun includes a gun body, a pump body, an outlet connector and an inlet control valve. The gun body includes a gun barrel and a handle connected to the gun barrel, and a control wrench is movably mounted on the handle. The pump body is mounted within the gun barrel, and the control wrench is configured to control the pump body to start and stop. The outlet connector is connected to an outlet pipe of the pump body. The inlet connector is configured to connect to an external water source, and the inlet connector is connected to an inlet pipe of the pump body. The inlet control valve is configured to connect the inlet connector to the inlet pipe of the pump body when the control wrench is operated.

16 Claims, 6 Drawing Sheets

ELECTRIC SPRAY GUN

CROSS-REFERENCE TO RELATED APPLICATIONS

The application claims priority of Chinese patent application CN2024226420713, filed on Oct. 31, 2024, which is incorporated herein by reference in its entireties.

TECHNICAL FIELD

The present invention relates to the technical field of spray guns, and in particular, to an electric spray gun.

BACKGROUND

At present, pistol-type electric spray guns typically have a pump installed inside the gun body, powered by a removable lithium battery with a universal interface which is located at the bottom of the handle. The pump is controlled by a wrench on the gun body, and different spray heads can be connected to the nozzle for various functions. In existing spray guns, the inlet connector is connected to a water tap, and the water flow from the tap has a certain pressure. When the pump is stopped, a one-way valve capable of withstanding relatively large pressure cannot be used in the water flow channel because it would significantly affect pressurization. As a result, leakage at the nozzle is inevitable under continuous water pressure, requiring the water tap to be turned off when not in use, which is inconvenient.

SUMMARY

The present invention aims to provide an electric spray gun, which is used to solve the problem of leakage at the nozzle when the water tap is not turned off.

In order to solve the technical problem, the technical scheme provided by the present invention is as follows.

An electric spray gun includes a gun body, a pump body, an outlet connector and an inlet control valve.

The gun body includes a gun barrel and a handle connected to the gun barrel, and a control wrench is movably mounted on the handle.

The pump body is mounted within the gun barrel, and the control wrench is configured to control the pump body to start and stop.

The outlet connector is connected to an outlet pipe of the pump body.

The inlet connector is configured to connect to an external water source, and the inlet connector is connected to an inlet pipe of the pump body.

The inlet control valve is configured to connect the inlet connector to the inlet pipe of the pump body when the control wrench is operated, and the inlet control valve is configured to block water flow from the inlet connector from entering the inlet pipe when the control wrench is not operated.

Furthermore, the inlet connector and the inlet pipe are connected through a connecting channel, and the inlet control valve is disposed on the connecting channel.

Furthermore, the inlet control valve includes a piston rod, a first end of the piston rod is connected to the control wrench, and a second end of the piston rod is disposed within the connecting channel; the piston rod is configured to block water flow from the inlet connector from entering the inlet pipe of the pump body when the control wrench is not operated, and the first end of the piston rod is configured to move to connect the inlet connector to the inlet pipe when the control wrench is operated.

Furthermore, the second end of the piston rod is formed with a sealing head configured to match a shape of a port of the connecting channel.

Furthermore, the inlet control valve further includes a sealing seat and a return spring, the sealing seat is disposed at an end of the connecting channel away from the inlet pipe, and the return spring is sleeved on the piston rod; the piston rod passes through the sealing seat, and two ends of the return spring respectively abut against the sealing head and the sealing seat.

Furthermore, a width of the connecting channel gradually decreases at an end adjacent to the inlet pipe, and a width of the sealing head gradually decreases in a direction towards the inlet pipe.

Furthermore, a first sealing ring is disposed between the piston rod and the sealing seat, and a second sealing ring is disposed between the sealing head and the connecting channel.

Furthermore, an annular groove is formed on an outer side wall of the sealing head, and the second sealing ring is sleeved within the annular groove.

Furthermore, an end of the piston rod away from the inlet pipe is connected to the control wrench through the pull rod.

Furthermore, the pull rod is rod-shaped, the control wrench is provided with a first pulling hole, and an end of the piston rod away from the inlet pipe is provided with a second pulling hole; one end of the pull rod passes through the first pulling hole and is bent to form a first hook, and the other end of the pull rod is bent to form a second hook disposed within the second pulling hole.

Furthermore, the inlet connector is perpendicular to the connecting channel, the connecting channel is perpendicular to the inlet pipe; the inlet connector is disposed below the connecting channel, and the inlet pipe is disposed above the connecting channel.

Furthermore, the electric spray gun further includes a bayonet pin, a pin hole perpendicular to an axial direction of the connecting channel is formed in the connecting channel at a position corresponding to the scaling seat, a clamping groove is formed in the sealing seat at a position corresponding to the pin hole, a part of the bayonet pin is inserted into the pin hole, and a part of the bayonet pin is disposed within the clamping groove.

Furthermore, two pin holes are provided, and the bayonet pin is U-shaped with two ends respectively inserted into the two pin holes.

Furthermore, the electric spray gun further includes a circuit board electrically connected to the pump body and a control switch electrically connected to the circuit board, the circuit board is disposed within the gun barrel or the handle, and the control switch is disposed within the gun barrel or the handle; the control wrench is provided with a linkage portion, the linkage portion is driven to move to trigger the control switch when the control wrench is operated, and the circuit board drives the pump body to operate when the control switch is triggered.

Furthermore, the control switch is a push-button switch disposed on the handle at a position corresponding to the linkage portion.

Furthermore, a lithium battery universal connector is provided at a bottom of the handle for installing a battery.

Furthermore, the handle is provided with a shaft rod, a circular hole is disposed at a position adjacent to a bottom of the control wrench, and the shaft rod is inserted into the circular hole; the first end of the piston rod is connected to the control wrench at a position above the circular hole.

Furthermore, the handle is provided with a limiting plate, an elastic member is disposed between the control wrench and the limiting plate, and the clastic member is located between the circular hole and the piston rod.

Furthermore, the gun body further includes a first housing and a second housing, and the first housing and the second housing are connected to form the gun barrel and the handle.

Furthermore, the circuit board is disposed behind the pump body.

The beneficial effects of the present invention are as follows. Compared with the prior art, the present invention adds an inlet control valve between the inlet connector and the inlet pipe of the pump body. The inlet control valve controls the entry of the water source into the pump body, thereby solving the problem of liquid leakage at the nozzle when the existing electric spray gun is connected to a water tap. In coordination with the user's operation of the control wrench, the inlet control valve is opened and the pump body is activated, allowing the water source to enter the pump body through the inlet connector. The pump body pressurizes the water source before outputting it, which is convenient for the user to operate and use.

BRIEF DESCRIPTION OF THE DRAWINGS

In order to explain the technical solutions of the embodiments of the present invention more clearly, the following will briefly introduce the accompanying drawings used in the embodiments. Apparently, the drawings in the following description are only some embodiments of the present invention. Those of ordinary skill in the art can obtain other drawings based on these drawings without creative work.

DETAILED DESCRIPTION OF THE EMBODIMENTS

Figure 1:
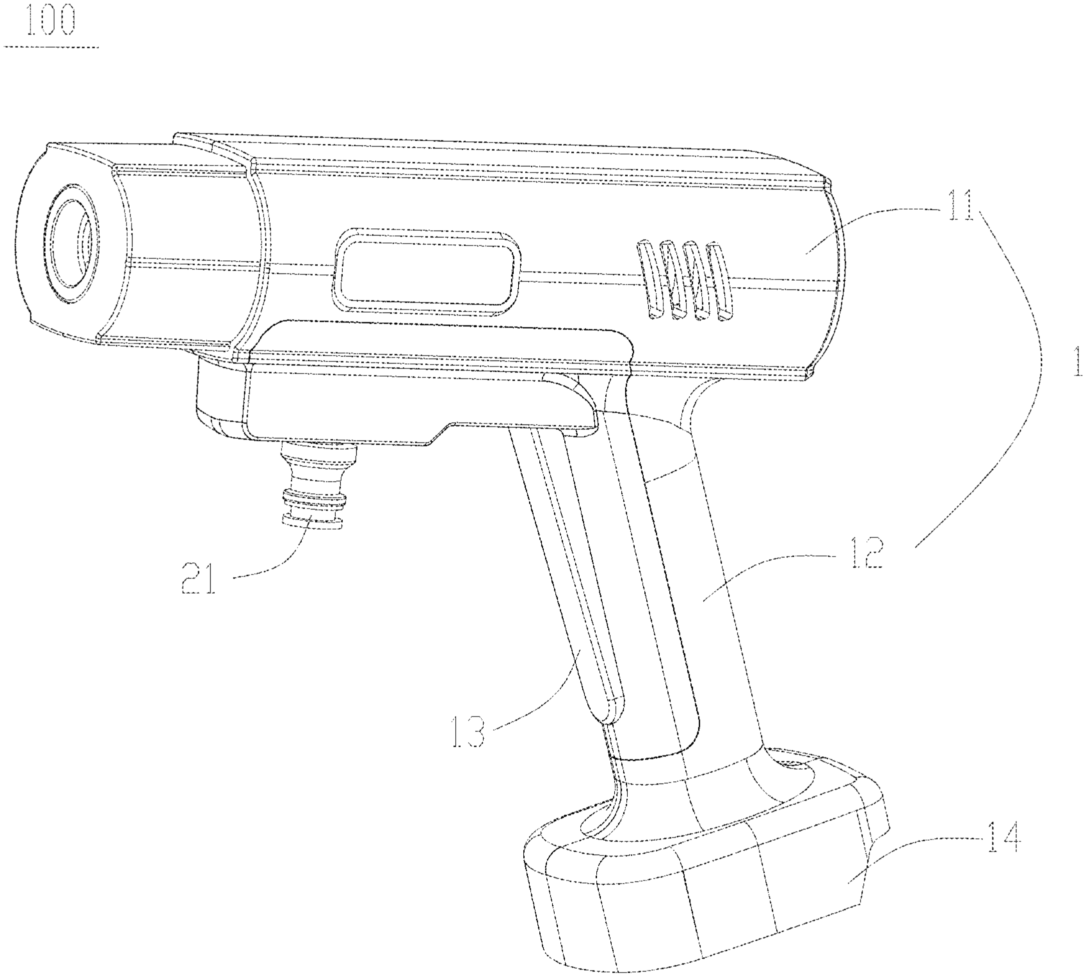
FIG. 1 is a perspective view according to the present invention.
Figure 2:
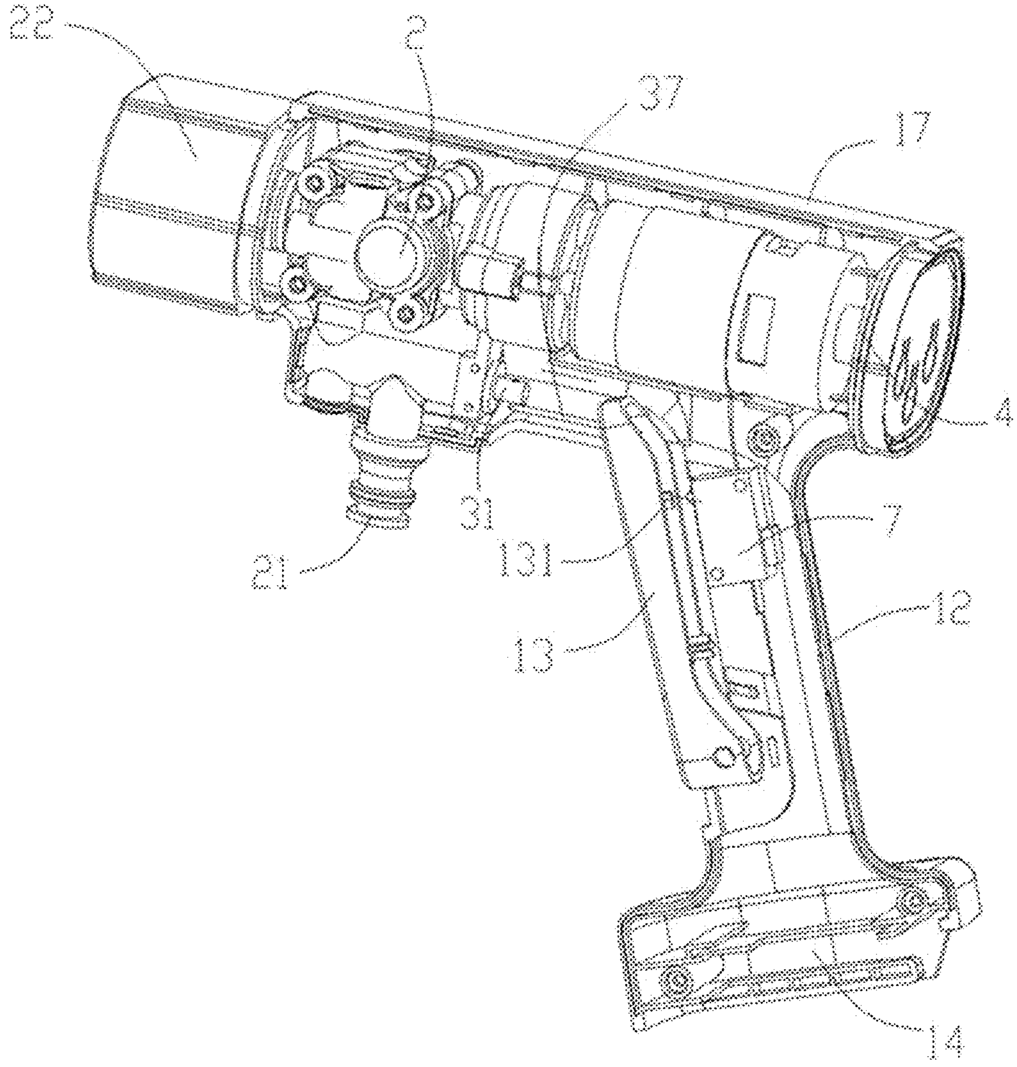
FIG. 2 is a schematic view with the first housing removed according to the present invention.
Figure 3:
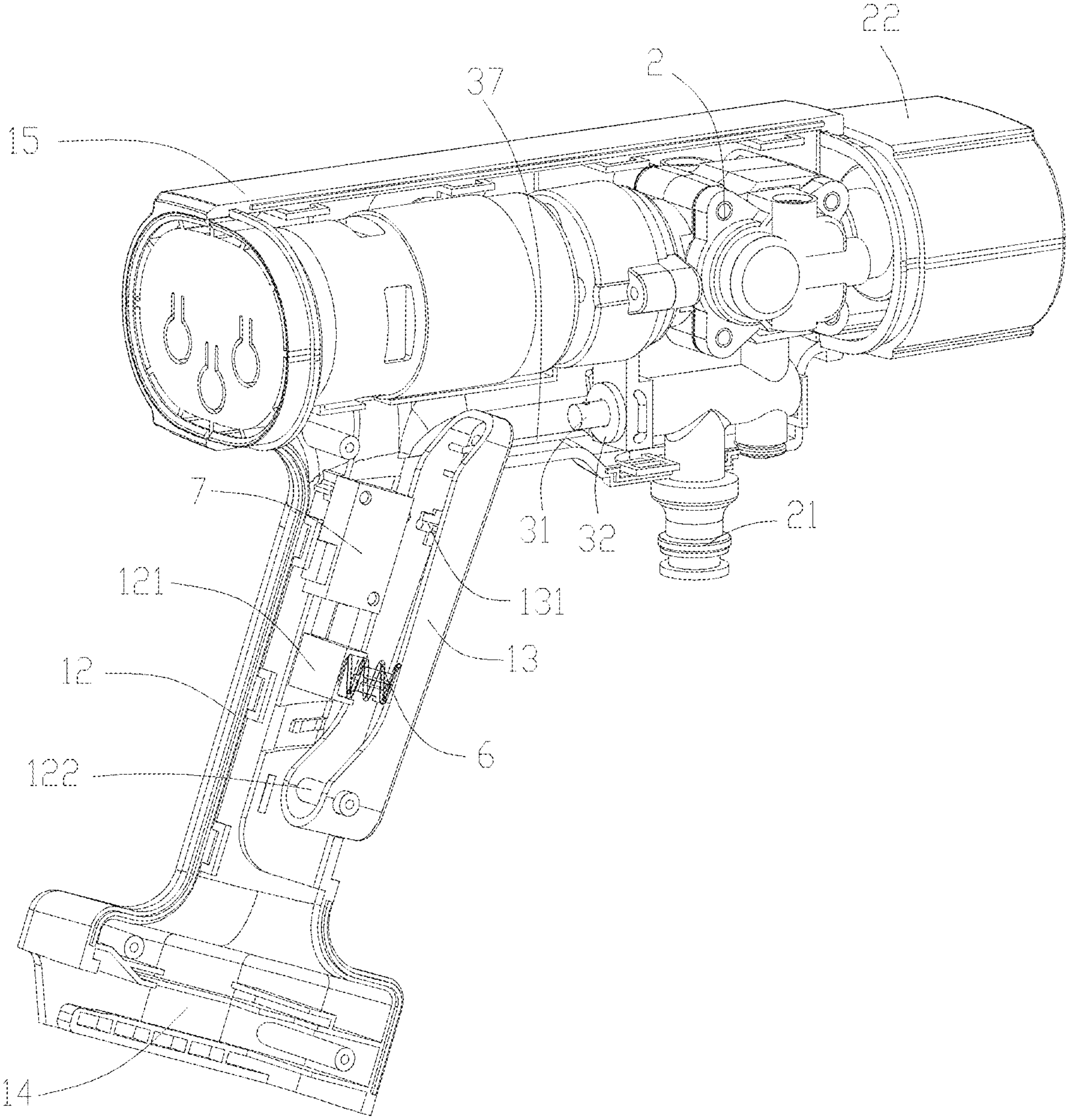
FIG. 3 is a schematic view with the second housing removed according to the present invention.

The technical solutions in the embodiments of the present invention will be clearly and completely described below in conjunction with the accompanying drawings in the embodiments of the present invention. Apparently, the described embodiments are only a part of the embodiments of the present invention, rather than all the embodiments. Based on the embodiments in the present invention, all other embodiments obtained by those ordinarily skilled in the art without doing creative work shall fall within the protection scope of the present invention.

Referring to FIGS. 1-7, the embodiment of the present invention provides an electric spray gun 100 including: a gun body 1, a pump body 2, an outlet connector 22, an inlet connector 21 and an inlet control valve 3. The gun body 1 includes a gun barrel 11 and a handle 12 connected to the gun barrel 11, and a control wrench 13 is movably mounted on the handle 12. The pump body 2 is mounted within the gun barrel 11, and the control wrench 13 is configured to control the pump body 2 to start and stop. The outlet connector 22 is connected to an outlet pipe of the pump body 2. The inlet connector 21 is configured to connect to an external water source, and the inlet connector 21 is connected to an inlet pipe 23 of the pump body 2. The inlet control valve 3 is configured to connect the inlet connector 21 to the inlet pipe 23 of the pump body 2 when the control wrench 13 is operated, and the inlet control valve 3 is configured to block water flow from the inlet connector 21 from entering the inlet pipe 23 when the control wrench 13 is not operated.

Through the arrangement of the above structure, when the user operates the electric spray gun 100, the control wrench 13 can start or stop the operation of the pump body 2. By configuring the inlet control valve 3 on the electric spray gun 100, when the control wrench 13 is operated, the inlet control valve 3 connects the inlet connector 21 to the inlet pipe 23. Combined with the operation of the pump body 2, the water source enters through the inlet connector 21 and flows into the pump body 2 via the inlet pipe 23, thereby forming a pressurized water flow that is sprayed out from the outlet connector 22. When the control wrench 13 is not operated, the inlet control valve 3 closes, preventing the water source from entering the inlet pipe 23 of the pump body 2 from the inlet connector 21, thereby preventing leakage at the nozzle. This solves the problem of liquid leakage at the nozzle when the electric spray gun 100 is connected to a tap that is left open, thus facilitating the user's operation.

In an embodiment, the inlet control valve 3 can be disposed between the inlet connector 21 and the inlet pipe 23 of the pump body 2. Alternatively, the inlet control valve 3 can also be disposed at the inlet connector 21 or the inlet pipe 23 of the pump body 2.

In an embodiment, the pump body 2 can be a booster pump, a micro-booster pump, and the like.

In an embodiment, the inlet connector 21 and the inlet pipe 23 of the pump body 2 are connected through a connecting channel 24, and the inlet control valve 3 is disposed on the connecting channel 24. By configuring the connecting channel 24, allows the user to configure the inlet control valve 3 more conveniently.

In the above embodiments, the inlet control valve 3 includes a piston rod 31. A first end of the piston rod 31 is connected to the control wrench 13, and a second end of the piston rod 31 is disposed within the connecting channel 24. When the control wrench 13 is not operated, the second end of the piston rod 31 blocks water flow from the inlet connector 21 entering the inlet pipe 23 of the pump body 2. When the control wrench 13 is operated, the second end of the piston rod 31 moves to connect the inlet connector 21 to the inlet pipe 23 of the pump body 2. When the user operates the control wrench 13, the inlet connector 21 is connected to the inlet pipe 23 of the pump body 2, thereby allowing the water source to enter the pump body 2 through the inlet connector 21 and the inlet pipe 23. As a result, the water source forms a water flow with a certain pressure and is sprayed out from the outlet connector 22.

In an embodiment, the second end of the piston rod 31 is formed with a sealing head 34 configured to match the shape of a port of the connecting channel 24. When the control wrench 13 is not operated, the sealing head 34 is adapted to the shape of the port of the connecting channel 24, which can block the water source from entering the inlet pipe 23. This effectively prevents liquid leakage at the nozzle when the electric spray gun 100 is connected to an external tap that is left open. It reduces the waste of water flow in the non-operating state and contributes to water conservation.

In an embodiment, the inlet control valve 3 further includes a scaling seat 32 and a return spring 33; the scaling seat 32 is disposed at an end of the connecting channel 24 away from the inlet pipe 23, and the return spring 33 is sleeved on the piston rod 31. The piston rod 31 passes through the sealing seat 32, and two ends of the return spring 33 respectively abut against the scaling head 34 and the scaling seat 32.

Specifically, the sealing seat 32 is provided with a piston hole 322, and the piston rod 31 passes through the piston hole. Through the arrangement of the above structure, when the user operates the control wrench 13, the return spring 33 is compressed, driving the piston rod 31 to move in the direction of the control wrench 13, thereby connecting the connecting channel 24 with the inlet pipe 23. When the user releases the control wrench 13, under the restoring force of the return spring 33, the piston rod 31 is driven to move in the direction of the inlet pipe 23, allowing the piston rod 31 to return to its initial state, thereby closing the connection between the inlet connector 21 and the inlet pipe 23, preventing the water source from entering the pump body 2 and leaking from the outlet connector 22, and ensuring the reliability of the inlet control.

In an embodiment, a width of the connecting channel 24 gradually decreases at an end adjacent to the inlet pipe 23, and a width of the sealing head 34 gradually decreases in a direction towards the inlet pipe 23.

Through the arrangement of the above structure, the outer dimensions of the scaling head 34 gradually decrease in the direction adjacent to the inlet pipe 23. When the control wrench 13 is not operated, the connecting channel 24 is effectively closed, thereby enabling better control of the water flow.

In an embodiment, a first sealing ring 36 is disposed between the piston rod 31 and the scaling seat 32, and a second sealing ring 35 is disposed between the scaling head 34 and the connecting channel 24. With the first sealing ring 36, the water source can be prevented from flowing out through the gap between the sealing seat 32 and the piston rod 31, and the water source can be stopped from entering the gun barrel 11 or the handle 12, thereby achieving a sealing effect. With the second sealing ring 35, the water source can be prevented from entering the inlet pipe 23 through the gap between the connecting channel 24 and the sealing head 34, thereby preventing liquid dripping from the nozzle and achieving a sealing effect.

In an embodiment, an annular groove 341 is formed on an outer side wall of the scaling head 34, and the second scaling ring 35 is sleeved within the annular groove 341.

Through the arrangement of the above structure, the second scaling ring 35 can be securely fixed on the sealing head 34, preventing the second sealing ring 35 from falling off during the movement of the piston rod 31 and ensuring the stability of the second sealing ring 35 during the operation.

In an embodiment, the electric spray gun 100 further includes a pull rod 37, an end of the piston rod 31 away from the inlet pipe 23 is connected to the control wrench 13 through the pull rod 37, thereby driving the piston rod 31 to move together with the control wrench 13. When the control wrench 13 is operated, the piston rod 31 moves under the pulling force of the pull rod 37 to connect the connecting channel 24. Moreover, when the user releases the control wrench 13, under the action of the return spring 33, the pull rod 37 can push the piston rod 31 to return to its initial position, thereby closing the connecting channel 24.

In an embodiment, the pull rod 37 is rod-shaped, the control wrench 13 is provided with a first pulling hole 135, and an end of the piston rod 31 away from the inlet pipe 23 is provided with a second pulling hole 311; one end of the pull rod 37 passes through the first pulling hole 135 and is bent to form a first hook 371, and the other end of the pull rod 37 is bent to form a second hook 372 disposed within the second pulling hole 311, thereby enabling the two ends of the pull rod 37 to be respectively connected to the piston rod 31 and the control wrench 13. Moreover, this structure is simple, which facilitates the connection of the two ends of the pull rod 37 to the piston rod 31 and the control wrench 13 respectively.

In an embodiment, the inlet connector 21 is perpendicular to the connecting channel 24, the connecting channel 24 is perpendicular to the inlet pipe 23, the inlet connector 21 is disposed below the connecting channel 24, and the inlet pipe 23 is disposed above the connecting channel 24. Through the arrangement of the above structure, the inlet connector 21 and the inlet pipe 23 are respectively disposed above and below the connecting channel 24. The water source flows from the inlet connector 21 into the inlet pipe 23 in an upward direction. Since the inlet control valve 3 is disposed between the inlet connector 21 and the inlet pipe 23, thereby enabling better control of the water flow.

In an embodiment, the electric spray gun 100 further includes a bayonet pin 5, a pin hole 25 perpendicular to an axial direction of the connecting channel 24 is formed in the connecting channel 24 at a position corresponding to the scaling seat 32, a clamping groove 321 is formed in the sealing seat 32 at a position corresponding to the pin hole 25, a part of the bayonet pin 5 is inserted into the pin hole 25, and a part of the bayonet pin 5 is disposed within the clamping groove 321, thereby fixing the sealing seat 32 within the connecting channel. Moreover, the design of the bayonet pin 5 can make the connection between the sealing seat 32 and the connecting channel 24 more stable. By using the bayonet pin 5, it effectively prevents the scaling seat 32 from loosening or detaching from the connecting channel 24 under the impact of water flow or the force exerted by the movement of the piston rod 31. This improves the durability and stability of the electric spray gun 100 and ensures its reliability for long-term use.

In an embodiment, two pin holes 25 are provided, and the bayonet pin 5 is U-shaped with two ends respectively inserted into the two pin holes 25. Through the arrangement of the above structure, the two ends of the U-shaped bayonet pin 5 are respectively inserted into the two pin holes 25. This simple structural design further enhances the stability of the connection between the scaling seat 32 and the connecting channel 24, while increasing structural compactness and strength.

In an embodiment, the electric spray gun 100 further includes a circuit board 4 electrically connected to the pump body 2 and a control switch 7 electrically connected to the circuit board 4; the circuit board 4 is disposed within the gun barrel 11 or the handle 12, and the control switch 7 is disposed within the gun barrel 11 or the handle 12; the control wrench 13 is provided with a linkage portion 131, the linkage portion 131 is driven to move to trigger the control switch 7 when the control wrench 13 is operated, and the circuit board 4 drives the pump body 2 to operate when the control switch 7 is triggered.

Through the arrangement of the above structure, when the control wrench 13 is operated, it drives the linkage portion 131 to trigger the control switch 7 of the circuit board 4. At this time, the circuit board 4 receives the electrical feedback signal from the triggered switch and can drive the pump body 2 to operate. In this way, the user can operate the control wrench 13 to control the operation of the pump body 2, thereby enhancing the user's convenience in operation.

Specifically, the control switch 7 is a push-button switch disposed on the handle 12 at a position corresponding to the linkage portion 131, so that when the control wrench 13 is operated, the linkage portion 131 can touch the control switch 7. Certainly, in other embodiments, the control switch 7 can also be a DIP switch, a touch switch, and the like.

In an embodiment, the circuit board 4 is disposed behind the pump body 2 to reasonably distribute the internal space and facilitate electrical connections among the circuit board 4, the pump body 2, and the trigger switch.

In an embodiment, the lithium battery universal connector 14 is provided at the bottom of the handle 12 for installing a battery. This allows the user to detachably install the lithium battery for the water gun through the universal lithium battery connector 14. After installation, the lithium battery for the water gun is electrically connected to the circuit board 4 via the universal lithium battery connector 14 to supply power to the circuit board 4. This eliminates the problem that the electric spray gun 100 needs to be connected to a power source in real-time, thereby facilitating the user's operation.

In an embodiment, the handle 12 is provided with a shaft rod 122, a circular hole 134 is disposed at a position adjacent to a bottom of the control wrench 13, and the shaft rod 122 is inserted into the circular hole 134; the first end of the piston rod 31 is connected to the control wrench 13 at a position above the circular hole 134. Through the arrangement of the above structure, when the user presses the control wrench 13, the control wrench 13 can rotate around the shaft rod 122. With the first end of the piston rod 31 connected to the control wrench 13 via the pull rod 37 and with the cooperation of the return spring 33, the control wrench 13 can return to its initial position after the user releases the pressing force on the control wrench 13.

In an embodiment, the handle 12 is provided with a limiting plate 121, an elastic member 6 is disposed between the control wrench 13 and the limiting plate 121. Through the arrangement of the above structure, the limiting plate 121 restricts the range of movement of the control wrench 13. At this time, the elastic member 6 is compressed, and the pull rod 37 can drive the piston rod 31 to move and compress the return spring 33. When the user releases the pressing force on the control wrench 13, the elastic member 6 can increase the force for the control wrench 13 to return to its initial state. In cooperation with the return spring 33, it can also increase the force for the piston rod 31 to return to its initial state, thereby ensuring that the sealing head 34 effectively seals the connecting channel 24.

In an embodiment, the gun body 1 further includes a first housing 15 and a second housing 17, and the first housing 15 and the second housing 17 are connected to form the gun barrel 11 and the handle 12. Through the arrangement of the above structure, it facilitates the production and manufacturing of the gun body 1, and also makes it easy to install components such as the pump body 2, the circuit board 4, and the control handle 12 on the gun body 1. Specifically, the first housing 15 and the second housing 17 can be firmly connected through fasteners such as buckles or screws.

Figure 4:
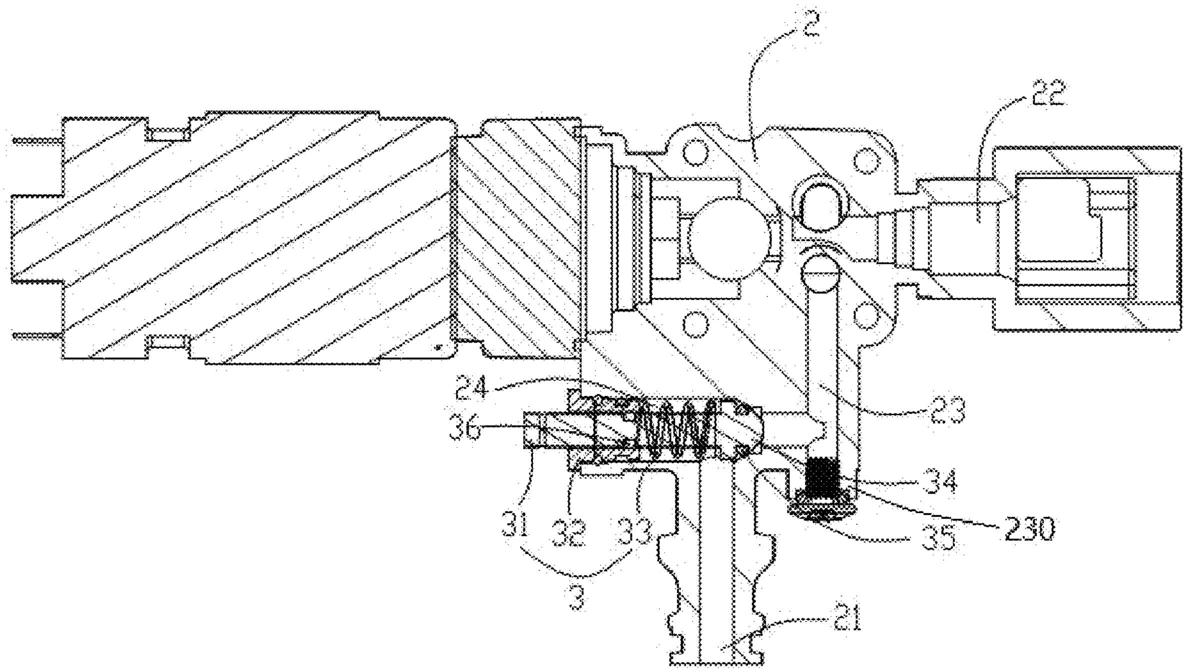
FIG. 4 is a cross-sectional view showing the pump body and the inlet control valve assembled as an integral unit and taken along the central axis of the inlet connector according to the present invention.
Figure 5:
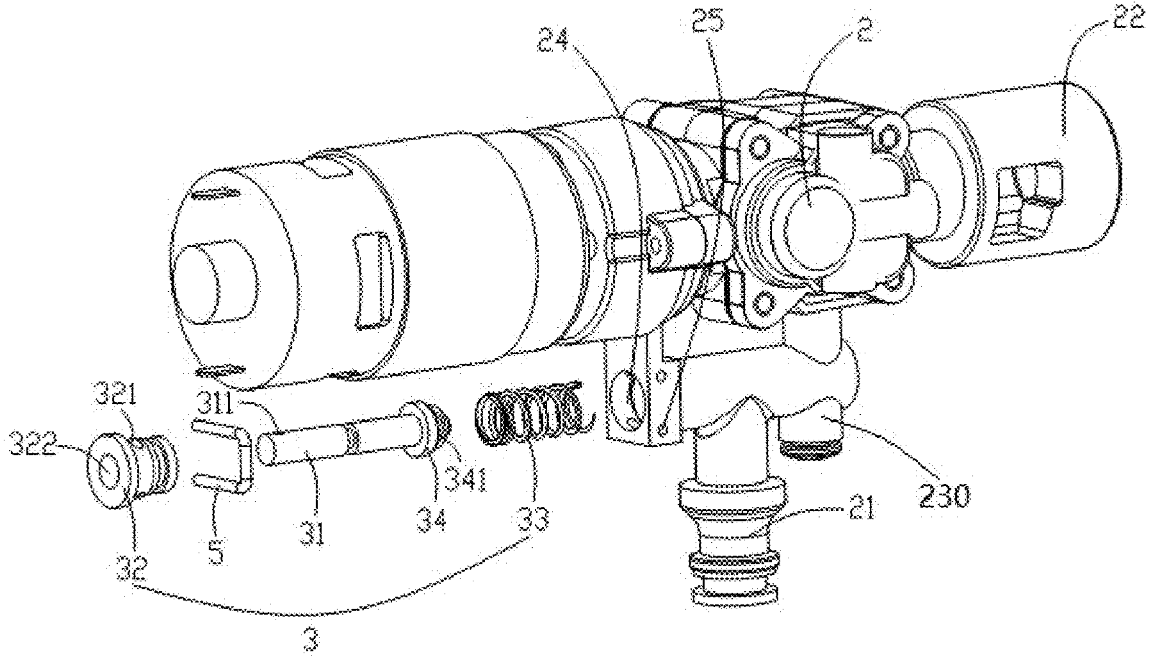
FIG. 5 is an exploded view of the pump body, the inlet control valve and the bayonet pin according to the present invention.
Figure 6:
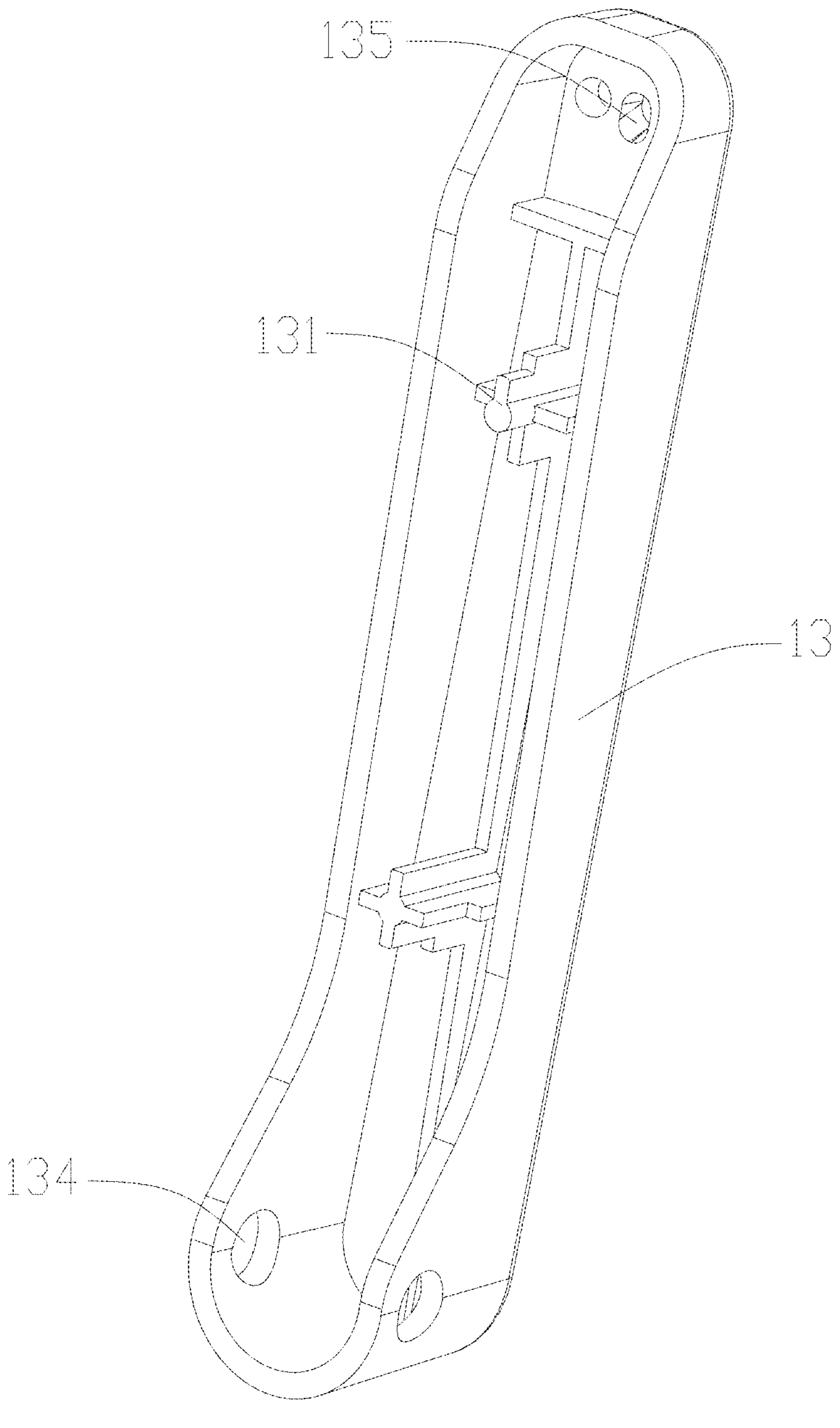
FIG. 6 is a structural diagram of the control wrench according to the present invention.
Figure 7:
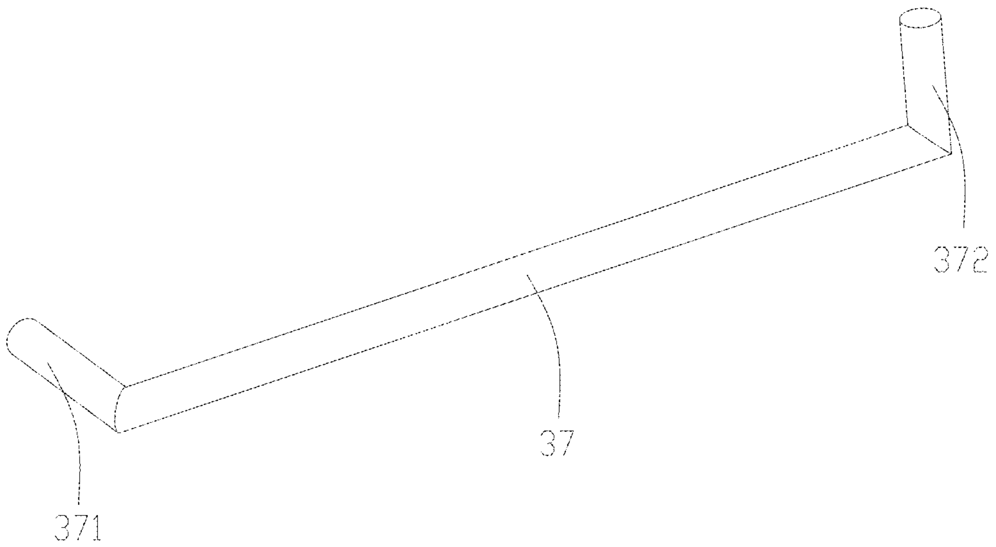
FIG. 7 is a structural diagram of the pull rod according to the present invention.

In an embodiment, as shown in FIGS. 4 and 5, the connecting channel 24 is connected to the inlet pipe 23 at a side of the inlet pipe 23, and an end of the inlet pipe 23 extends beyond the connecting channel 24 to form an extending section 230 arranged side-by-side with the inlet connector 21.

It should be noted that all directional indications (such as up, down, left, right, front, back . . . ) in the embodiments of the present invention are only used to explain a relative positional relationship between components, motion situations, etc. at a certain specific attitude (as shown in the figures). If the specific attitude changes, the directional indication also correspondingly changes.

In addition, the descriptions of "first", "second", etc. in the present invention are only used for descriptive purposes, and cannot be understood as indicating or implying its relative importance or implicitly indicating the number of technical features indicated. Therefore, features defined by "first" and "second" can explicitly instruct or impliedly include at least one feature. In addition, "and/or" in the entire text includes three solutions. A and/or B is taken as an example, including technical solution A, technical solution B, and technical solutions that both A and B satisfy. In addition, the technical solutions between the various embodiments can be combined with each other, but it needs be based on what can be achieved by those of ordinary skill in the art. When the combination of the technical solutions is contradictory or cannot be achieved, it should be considered that such a combination of the technical solutions does not exist, and is not within the scope of protection claimed by the present invention.

The above descriptions are only preferred embodiments of the present invention, and are not intended to limit the patent scope of the present invention. Any equivalent structural transformation made by using the content of the specification and the drawings of the present invention under the invention idea of the present invention, directly or indirectly applied to other related technical fields, shall all be included in the scope of patent protection of the present invention.

What is claimed is:

1. An electric spray gun, comprising:

a gun body, wherein the gun body comprises a gun barrel and a handle connected to the gun barrel, and a control wrench is movably mounted on the handle;

a pump body, wherein the pump body is mounted within the gun barrel, and the control wrench is configured to control the pump body to start and stop;

an outlet connector, wherein the outlet connector is connected to an outlet pipe of the pump body;

an inlet connector, wherein the inlet connector is configured to connect to an external water source, and the inlet connector is connected to an inlet pipe of the pump body; and an inlet control valve, wherein the inlet control valve is configured to connect the inlet connector to the inlet pipe of the pump body when the control wrench is operated, and the inlet control valve is configured to block water flow from the inlet connector from entering the inlet pipe when the control wrench is not operated;

wherein the inlet connector and the inlet pipe are connected through a connecting channel, and the inlet control valve is disposed on the connecting channel;

wherein the inlet control valve comprises a piston rod, a first end of the piston rod is connected to the control wrench, and a second end of the piston rod is disposed within the connecting channel; the piston rod is configured to block water flow from the inlet connector from entering the inlet pipe of the pump body when the control wrench is not operated, and the first end of the piston rod is configured to move to connect the inlet connector to the inlet pipe when the control wrench is operated; and wherein the electric spray gun further comprises a pull rod, the first end of the piston rod is connected to the control wrench through the pull rod, and the pull rod is rod-shaped, the control wrench is provided with a first pulling hole, and the first end of the piston rod is provided with a second pulling hole; one end of the pull rod passes through the first pulling hole and is bent to form a first hook, and the other end of the pull rod is bent to form a second hook disposed within the second pulling hole;

wherein the inlet control valve further comprises a sealing seat and a return spring, the sealing seat is disposed at an end of the connecting channel away from the inlet pipe, and the return spring is sleeved on the piston rod; the piston rod passes through the sealing seat, and two ends of the return spring respectively abut against a sealing head formed on the piston rod, and the sealing seat; wherein an inner diameter of the sealing seat is smaller than an outer diameter of the return spring;

wherein the electric spray gun further comprises a bayonet pin, a pin hole perpendicular to an axial direction of the connecting channel is formed in the connecting channel at a position corresponding to the sealing seat, a clamping groove is formed in the sealing seat at a position corresponding to the pin hole, a part of the bayonet pin is inserted into the pin hole, and a part of the bayonet pin is disposed within the clamping groove;

wherein the connecting channel is connected to the inlet pipe at a side of the inlet pipe, and an end of the inlet pipe extends beyond the connecting channel to form an extending section arranged side-by-side with the inlet connector.

2. The electric spray gun according to claim 1, wherein the second end of the piston rod is formed with the sealing head, which is configured to match a shape of a port of the connecting channel.

3. The electric spray gun according to claim 1, wherein a width of the connecting channel gradually decreases at an end adjacent to the inlet pipe, and a width of the sealing head gradually decreases in a direction towards the inlet pipe.

4. The electric spray gun according to claim 1, wherein a first sealing ring is disposed between the piston rod and the sealing seat, and a second sealing ring is disposed between the sealing head and the connecting channel.

5. The electric spray gun according to claim 4, wherein an annular groove is formed on an outer side wall of the sealing head, and the second sealing ring is sleeved within the annular groove.

6. The electric spray gun according to claim 1, wherein the inlet connector is perpendicular to the connecting channel, the connecting channel is perpendicular to the inlet pipe; the inlet connector is disposed below the connecting channel, and the inlet pipe is disposed above the connecting channel.

7. The electric spray gun according to claim 1, wherein two pin holes are provided, and the bayonet pin is U-shaped with two ends respectively inserted into the two pin holes.

8. The electric spray gun according to claim 1, further comprising a circuit board electrically connected to the pump body and a control switch electrically connected to the circuit board, wherein the circuit board is disposed within the gun barrel or the handle, and the control switch is disposed within the gun barrel or the handle; the control wrench is provided with a linkage portion, the linkage portion is driven to move to trigger the control switch when the control wrench is operated, and the circuit board drives the pump body to operate when the control switch is triggered.

9. The electric spray gun according to claim 8, wherein the control switch is a push-button switch disposed on the handle at a position corresponding to the linkage portion.

10. The electric spray gun according to claim 1, wherein a lithium battery universal connector is provided at a bottom of the handle for installing a battery.

11. The electric spray gun according to claim 1, wherein the handle is provided with a shaft rod, a circular hole is disposed at a position adjacent to a bottom of the control wrench, and the shaft rod is inserted into the circular hole; the first end of the piston rod is connected to the control wrench at a position above the circular hole.

12. The electric spray gun according to claim 11, wherein the handle is provided with a limiting plate, an elastic member is disposed between the control wrench and the limiting plate, and the elastic member is located between the circular hole and the piston rod.

13. The electric spray gun according to claim 1, wherein the gun body further comprises a first housing and a second housing, and the first housing and the second housing are connected to form the gun barrel and the handle.

14. The electric spray gun according to claim 8, wherein the circuit board is disposed behind the pump body.

15. An electric spray gun, comprising:

a gun body, wherein the gun body comprises a gun barrel and a handle connected to the gun barrel, and a control wrench is movably mounted on the handle;

a pump body, wherein the pump body is mounted within the gun barrel, and the control wrench is configured to control the pump body to start and stop;

an outlet connector, wherein the outlet connector is connected to an outlet pipe of the pump body;

an inlet connector, wherein the inlet connector is configured to connect to an external water source, and the inlet connector is connected to an inlet pipe of the pump body; and an inlet control valve, wherein the inlet control valve is configured to connect the inlet connector to the inlet pipe of the pump body when the control wrench is operated, and the inlet control valve is configured to block water flow from the inlet connector from entering the inlet pipe when the control wrench is not operated;

wherein the inlet connector and the inlet pipe are connected through a connecting channel, and the inlet control valve is disposed on the connecting channel;

wherein the inlet control valve comprises a piston rod, a first end of the piston rod is connected to the control wrench, and a second end of the piston rod is disposed within the connecting channel; the piston rod is configured to block water flow from the inlet connector from entering the inlet pipe of the pump body when the control wrench is not operated, and the first end of the piston rod is configured to move to connect the inlet connector to the inlet pipe when the control wrench is operated;

wherein the second end of the piston rod is formed with a sealing head configured to match a shape of a port of the connecting channel; the inlet control valve further comprises a sealing seat and a return spring, the sealing seat is disposed at an end of the connecting channel away from the inlet pipe, and the return spring is sleeved on the piston rod; the piston rod passes through the sealing seat, and two ends of the return spring respectively abut against the sealing head and the sealing seat; wherein an inner diameter of the sealing seat is smaller than an outer diameter of the return spring;

wherein the electric spray gun further comprises a bayonet pin, wherein a pin hole perpendicular to an axial direction of the connecting channel is formed in the connecting channel at a position corresponding to the sealing seat, a clamping groove is formed in the sealing seat at a position corresponding to the pin hole, a part of the bayonet pin is inserted into the pin hole, and a part of the bayonet pin is disposed within the clamping groove, thereby fixing the sealing seat within the connecting channel;

wherein the connecting channel is connected to the inlet pipe at a side of the inlet pipe, and an end of the inlet pipe extends beyond the connecting channel to form an extending section arranged side-by-side with the inlet connector.

16. An electric spray gun, comprising:

a gun body, wherein the gun body comprises a gun barrel and a handle connected to the gun barrel, and a control wrench is movably mounted on the handle;

a pump body, wherein the pump body is mounted within the gun barrel, and the control wrench is configured to control the pump body to start and stop;

an outlet connector, wherein the outlet connector is connected to an outlet pipe of the pump body;

an inlet connector, wherein the inlet connector is configured to connect to an external water source, and the inlet connector is connected to an inlet pipe of the pump body; and an inlet control valve, wherein the inlet control valve is configured to connect the inlet connector to the inlet pipe of the pump body when the control wrench is operated, and the inlet control valve is configured to block water flow from the inlet connector from entering the inlet pipe when the control wrench is not operated;

wherein the inlet connector and the inlet pipe are connected through a connecting channel, and the inlet control valve is disposed on the connecting channel;

wherein the connecting channel is connected to the inlet pipe at a side of the inlet pipe, and an end of the inlet pipe extends beyond the connecting channel to form an extending section arranged side-by-side with the inlet connector.

* * * * *